United States Patent
Ramanujam et al.

(10) Patent No.: US 7,346,616 B2
(45) Date of Patent: Mar. 18, 2008

(54) SYNCHRONIZING DATA SHARED BETWEEN TWO DEVICES INDEPENDENT OF ANY OTHER DEVICES THAT MAY ALSO SHARE THE DATA

(75) Inventors: Srinivasan Ramanujam, Boise, ID (US); Senthil Krishnapillai, Boise, ID (US)

(73) Assignee: Extended System, Inc., Boise, ID (US)

( * ) Notice: Subject to any disclaimer, the term of this patent is extended or adjusted under 35 U.S.C. 154(b) by 853 days.

(21) Appl. No.: 10/103,491

(22) Filed: Mar. 20, 2002

(65) Prior Publication Data

US 2003/0182327 A1    Sep. 25, 2003

(51) Int. Cl.
G06F 17/30    (2006.01)
(52) U.S. Cl. ......................... 707/8; 707/201
(58) Field of Classification Search ............... 707/8, 707/10, 100, 200–204, 205
See application file for complete search history.

(56) References Cited

U.S. PATENT DOCUMENTS

| | | | |
|---|---|---|---|
| 5,519,606 A | 5/1996 | Frid-Nielsen et al. | |
| 5,778,346 A | 7/1998 | Frid-Nielsen et al. | |
| 5,884,325 A * | 3/1999 | Bauer et al. | 707/201 |
| 6,081,806 A * | 6/2000 | Chang et al. | 707/8 |
| 6,092,083 A * | 7/2000 | Brodersen et al. | 707/201 |
| 6,216,131 B1 | 4/2001 | Liu et al. | |
| 6,247,135 B1 * | 6/2001 | Feague | 713/400 |
| 6,275,831 B1 | 8/2001 | Bodnar et al. | |
| 6,295,541 B1 | 9/2001 | Bodnar et al. | |
| 6,393,419 B1 * | 5/2002 | Novak et al. | 707/8 |
| 6,401,104 B1 * | 6/2002 | LaRue et al. | 707/203 |
| 6,446,092 B1 * | 9/2002 | Sutter | 707/203 |
| 6,449,622 B1 | 9/2002 | LaRue et al. | |
| 6,460,051 B1 | 10/2002 | LaRue et al. | |
| 6,477,545 B1 | 11/2002 | LaRue | |
| 6,487,560 B1 | 11/2002 | LaRue et al. | |
| 6,496,835 B2 | 12/2002 | Liu et al. | |
| 6,516,314 B1 * | 2/2003 | Birkler et al. | 707/8 |
| 6,535,892 B1 | 3/2003 | LaRue et al. | |
| 6,560,700 B1 * | 5/2003 | Birkler et al. | 713/1 |
| 6,625,621 B2 | 9/2003 | Tan et al. | |
| 6,643,669 B1 * | 11/2003 | Novak et al. | 707/201 |
| 6,671,703 B2 | 12/2003 | Thompson et al. | |
| 2002/0038314 A1 | 3/2002 | Thompson et al. | |
| 2002/0133508 A1 | 9/2002 | LaRue et al. | |
| 2002/0156798 A1 | 10/2002 | LaRue et al. | |
| 2002/0194207 A1 | 12/2002 | Bartlett et al. | |
| 2003/0097381 A1 * | 5/2003 | Detweiler et al. | 707/201 |

* cited by examiner

Primary Examiner—Greta L Robinson
(74) Attorney, Agent, or Firm—Ormiston & McKinney, PLLC

(57) ABSTRACT

A system and method enabling synchronization of data stored on three or more devices in which synchronization between any two of the devices can be conducted independently of the other device. A method embodying the invention involves identifying a record in a first data store that is associated with a change counter that exceeds a maximum change counter recorded for the first data store and updating a second data store using the identified record.

15 Claims, 8 Drawing Sheets

| CONTRACTS TABLE (SERVER DATABASE) | | | |
|---|---|---|---|
| USER ID | CONTRACT ID | ADAPTER ID | STORE ID |
| JOHN DOE | #### | SERVER ADAPTER | SERVER DATA STORE |
| JOHN DOE | #### | LOCAL ADAPTER | LOCAL DATA STORE |
| JOHN DOE | #### | MOBILE ADAPTER | MOBILE DATA STORE |

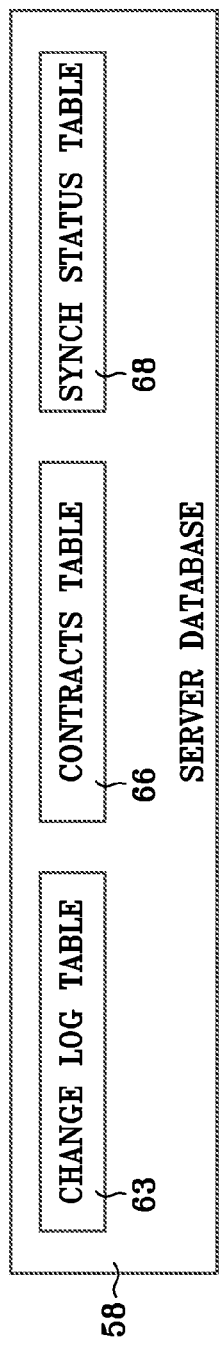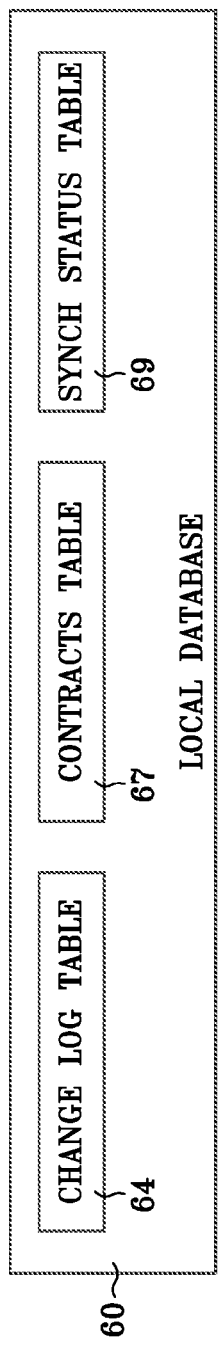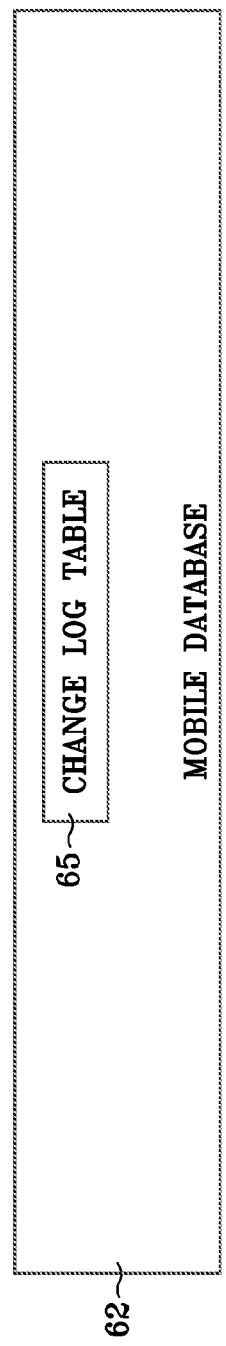

FIG. 7A — CHANGE LOG TABLE (SERVER DATABASE) 63

| GLOBAL ID 70 | RECORD ID 72 | CHANGE COUNTER 74 | STATUS 76 |
|---|---|---|---|
| AAAAA | SERVER FILE 1 | 203 | MODIFIED |
| BBBBB | SERVER FILE 2 | 201 | NEW |
| CCCCC | SERVER FILE 3 | 200 | DELETED |

FIG. 7B — CHANGE LOG TABLE (LOCAL DATABASE) 64

| GLOBAL ID 70 | RECORD ID 72 | CHANGE COUNTER 74 | STATUS 76 |
|---|---|---|---|
| AAAAA | LOCAL FILE 1 | 203 | MODIFIED |
| BBBBB | LOCAL FILE 2 | 201 | NEW |
| CCCCC | LOCAL FILE 3 | 200 | DELETED |

FIG. 7C — CHANGE LOG TABLE (MOBILE DATABASE) 65

| GLOBAL ID 70 | RECORD ID 72 | CHANGE COUNTER 74 | STATUS 76 |
|---|---|---|---|
| AAAAA | MOBILE FILE 1 | 203 | MODIFIED |
| BBBBB | MOBILE FILE 2 | 201 | NEW |
| CCCCC | MOBILE FILE 3 | 200 | DELETED |

66

CONTRACTS TABLE (SERVER DATABASE) 80

| USER ID 78 | CONTRACT ID 80 | ADAPTER ID 82 | STORE ID 84 |
|---|---|---|---|
| JOHN DOE | #### | SERVER ADAPTER | SERVER DATA STORE |
| JOHN DOE | #### | LOCAL ADAPTER | LOCAL DATA STORE |
| JOHN DOE | #### | MOBILE ADAPTER | MOBILE DATA STORE |

CONTRACTS TABLE (LOCAL DATABASE)

| USER ID 78 | CONTRACT ID 80 | ADAPTER ID 82 | STORE ID 84 |
|---|---|---|---|
| JOHN DOE | ##### | LOCAL ADAPTER | LOCAL DATA STORE |
| JOHN DOE | ##### | MOBILE ADAPTER | MOBILE DATA STORE |

68 — SYNCH STATUS TABLE (SERVER DATABASE)

| CONTRACT ID (86) | FIRST ADAPTER ID (88) | FIRST MAX CHANGE COUNTER (90) | SECOND ADAPTER ID (92) | SECOND MAX CHANGE COUNTER (94) |
|---|---|---|---|---|
| ##### | SERVER ADAPTER | ### | LOCAL ADAPTER | ### |
| ##### | SERVER ADAPTER | ### | MOBILE ADAPTER | ### |

FIG. 11

69 — SYNCH STATUS TABLE (LOCAL DATABASE)

| CONTRACT ID (86) | FIRST ADAPTER ID (88) | FIRST MAX CHANGE COUNTER (90) | SECOND ADAPTER ID (92) | SECOND MAX CHANGE COUNTER (94) |
|---|---|---|---|---|
| ##### | LOCAL ADAPTER | ### | MOBILE ADAPTER | ### |

SYNCHRONIZING DATA SHARED BETWEEN TWO DEVICES INDEPENDENT OF ANY OTHER DEVICES THAT MAY ALSO SHARE THE DATA

FIELD OF THE INVENTION

This invention relates to synchronizing electronic data. Specifically, this invention is directed to a method and system for synchronizing data shared between two devices independent of any other devices that may also share the data.

BACKGROUND OF THE INVENTION

In today's computer networks, sharing data among devices has become desirable if not essential. Not only does the shared data need to be replicated on each device, but the set of replicated data must be synchronized so that changes made to one replica are reflected in all the others. Synchronization enables many users to work with their own local copy of shared data but have the shared data updated as if they were working on a single, centralized database. For shared data applications where users are geographically widely distributed, replication and synchronization are often the most efficient methods for effectively utilizing shared data.

In addition to desktop computers, workstations, and servers, modern computing environments often include lightweight handheld computing devices that fit into a pocket, purse, or day planner. Modern computing environments range from private networks to the Internet. Although a wide range of application programs can be executed on handheld computers, shared data applications are particularly popular and well suited for these devices. Shared data applications include, among many others, electronic calendars and task lists, electronic mail organizers, and electronic address books. A device running one or more of these applications stores electronic data that is or can be replicated and shared with other devices. It is desirable, if not essential, then to at least periodically synchronize data stored on each device. For example, many calendaring applications allow devices to share data or records concerning each user's appointments. It is important that when a new appointment is added or an existing appointment is modified on one device that addition or change is reflected on all devices providing calendaring.

Where only two computing devices are involved, synchronization is a relatively simple process. However, modern computing environments tend to be more complex. A single user desires to synchronize shared data stored on three or more devices. FIG. 1 provides an example of a conventional approach to synchronizing shared data between three computing devices. The shared data environment 10 of FIG. 1 includes server 12, mobile device 14, and desktop computer 16 each interconnected by link 18. Each device 12, 14, and 16 includes a data store 19, 20, or 21 containing shared data to be synchronized. Server 12 also includes synch engine 22, programming capable of identifying changes in one data store 19, 20, or 21, and updating the other data stores to reflect those changes. Where synch engine 22 detects changes to data store 18 on server 12, it can directly update data stores 20 and 21 on mobile device 14 and desktop computer 16. However, an indirect approach is required to update data store 20 on mobile device 14 to reflect changes detected in data store 21 on desktop computer 16. The same is true when updating data store 21 on desktop computer 16 to reflect changes detected in data store 20 on mobile device 14. First synch engine 22 updates data store 19 on server 12 to reflect the changes and then updates data stores 20 and 21 on mobile device 14 or desktop computer 16.

The approach of FIG. 1 works well when mobile device 14 and desktop computer 16 are connected to server 12 and when it is not desirable to synchronize data directly between mobile device 14 and desktop computer 16. However, as its label suggests, mobile device 14 is often not connected to server 12, and it is often desirable to synchronize data directly between mobile device 14 and desktop computer 16.

SUMMARY OF THE INVENTION

Accordingly, the present invention is directed to the synchronization of data shared between two devices independent of any other devices that may also share the data. One method embodying the invention includes recording a highest of one or more change counters associated with a record or records in a first data store as a maximum change counter; identifying a record in the first data store that is associated with a change counter that exceeds the maximum change counter; and finally updating a record in a second data store according to the identified record.

DESCRIPTION OF THE DRAWINGS

FIGS. 4-6 are block diagrams illustrating the logical memory elements of server, local, and mobile databases according to an embodiment of the present invention.

FIG. 7A is a block diagram illustrating the logical memory elements of a change log table from the server database of FIG. 4 according to an embodiment of the present invention.

FIG. 7B is a block diagram illustrating the logical memory elements of a change log table from the local database of FIG. 5 according to an embodiment of the present invention.

FIG. 7C is a block diagram illustrating the logical memory elements of a change log table from the mobile database of FIG. 6 according to an embodiment of the present invention.

FIG. 8 is a block diagram illustrating the logical memory elements of the contracts table from the server database of FIG. 4 according to an embodiment of the present invention.

FIG. 9 is a block diagram illustrating the logical memory elements of the contracts table from the local database of FIG. 5 according to an embodiment of the present invention.

FIG. 10 is a block diagram illustrating the logical memory elements of the synch status table from the server database of FIG. 4 according to an embodiment of the present invention.

FIG. 11 is a block diagram illustrating the logical memory elements of the synch status table from the local database of FIG. 5 according to an embodiment of the present invention

DETAILED DESCRIPTION OF THE INVENTION

In today's mobile computing environments electronic records are replicated and shared across many devices. The following description is broken into three parts. The first discusses the logical programming and memory elements of an embodiment of the present invention. The second section discusses in general terms the operation of those elements, and the third section provides specific examples.

It is expected that various embodiments of the present invention will enable data to be directly synchronized between any two devices independently of the other devices. Although the various embodiments of the invention disclosed herein will be described with reference to the shared data environment 24 shown schematically in FIG. 2, the invention is not limited to use with shared data environment 24. The invention may be implemented in or used with any environment in which it is necessary or desirable to synchronize shared data. The following description and the drawings illustrate only a few exemplary embodiments of the invention. Other embodiments, forms, and details may be made without departing from the spirit and scope of the invention, which is expressed in the claims that follow this description.

Figure 1:
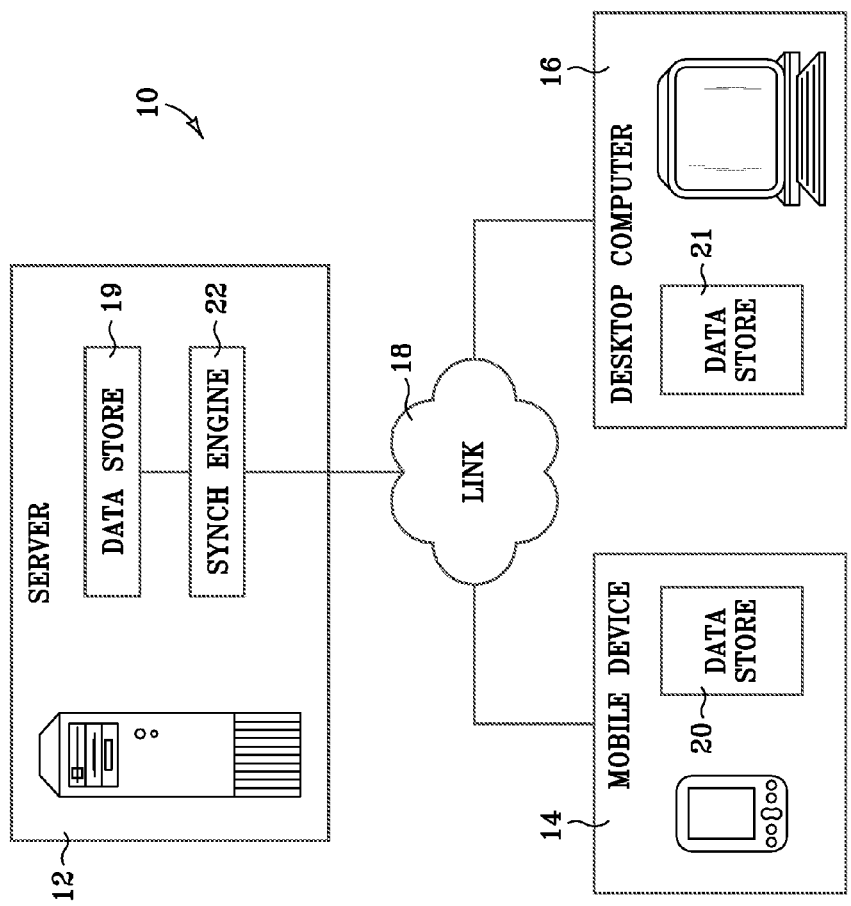
FIG. 1 is a schematic representation of a shared data environment in which a server acts as a hub directing synchronization between a mobile device, a desktop computer, and the server.
Figure 2:
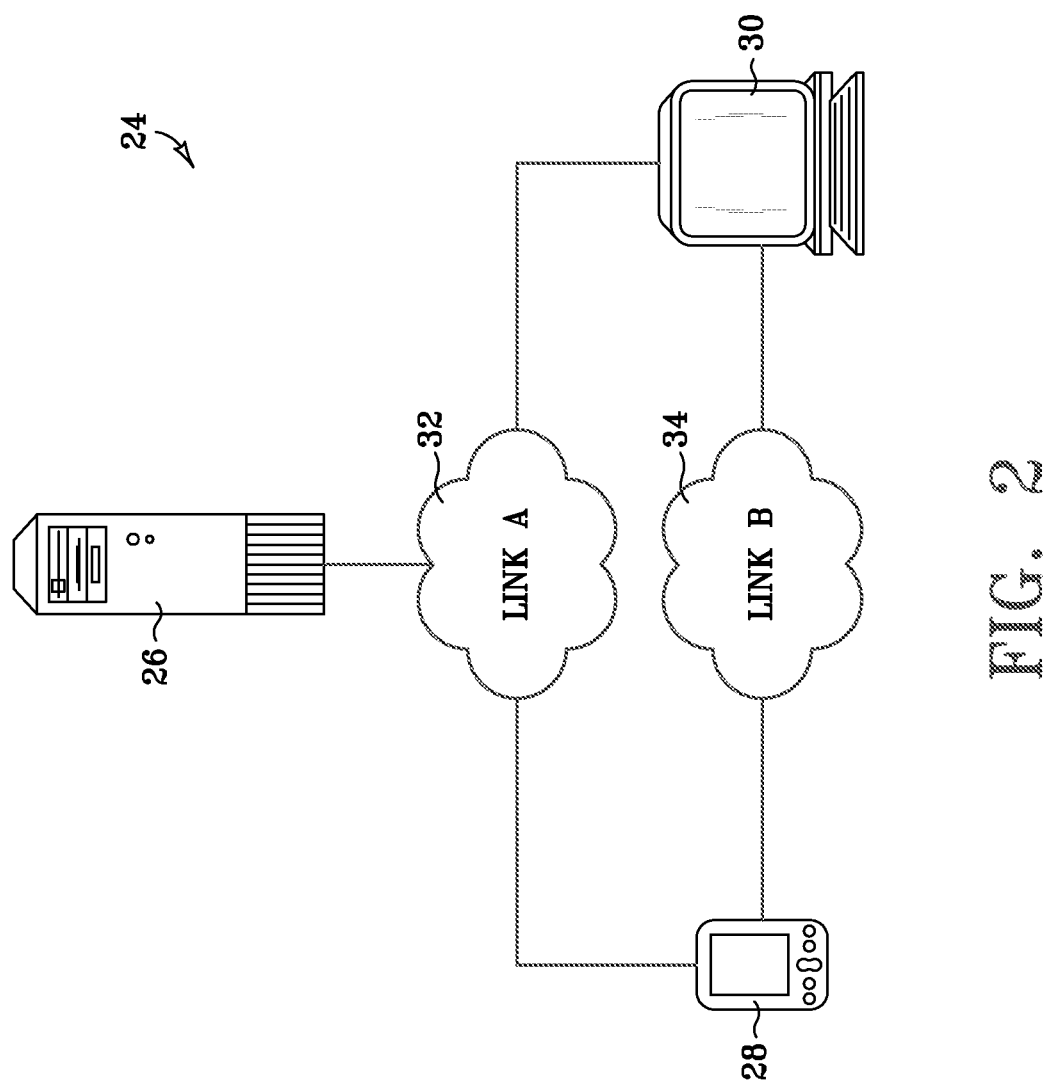
FIG. 2 is a schematic representation of a shared data environment having a server, a mobile device, and a local device in which various embodiments of the present invention may be incorporated.

Referring to FIG. 2, shared data environment 24 represents generally a computer environment in which a variety of electronic devices are linked. Devices 26, 28, and 30 represent electronic devices such as, but not limited to, servers, personal digital assistants or other mobile computing devices, and desktop computers. Communication link A 32 interconnects devices 26, 28, and 30, while communications link B 34 interconnects devices 28 and 30. Link A 32 and link B 34 represent generally cable, wireless, or remote connections via a telecommunication link, an infrared link, a radio frequency link, or any other connector or system that provides electronic communication between devices 26, 28, and 30. Links 32 and 34 may represent an intranet, the Internet, or a combination of both. The paths followed by links 32 and 34 between devices 26, 28, and 30 in the schematic view of FIG. 2 represent the logical communication paths between these devices, not necessarily the physical paths between the devices. Devices 26, 28, and 30 can be connected at any point and the appropriate communication paths established logically between the devices. While each device 26, 28, and 30 are shown connected in shared data environment 24, any device 26, 28, and/or 30 may be removed and later reconnected to links 32 and 34. This is expected to be the case for mobile devices such as personal digital assistants and laptop computers.

Figure 3:
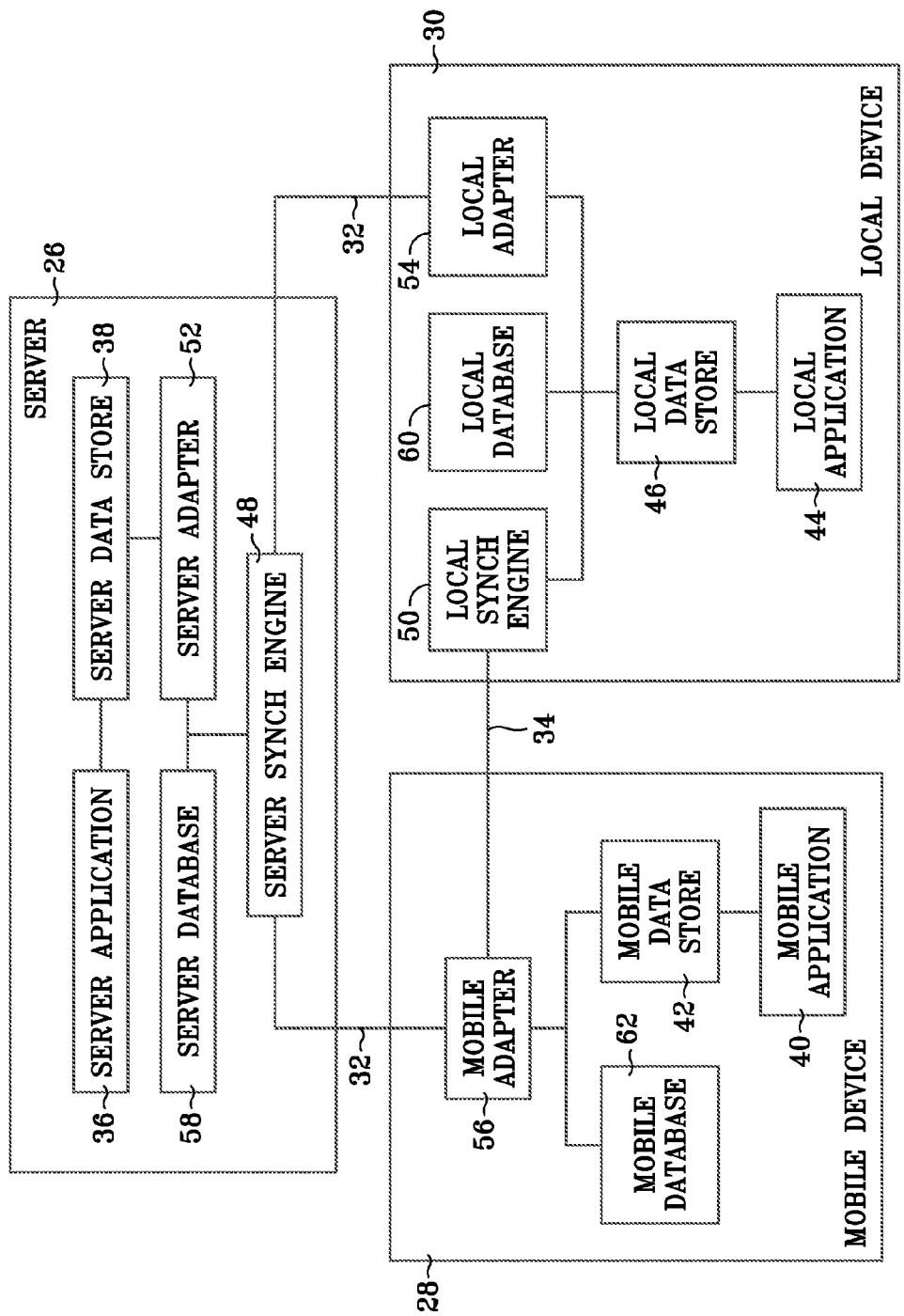
FIG. 3 is a block diagram illustrating the logical programming elements of the devices of FIG. 2 according to an embodiment of the present invention.

COMPONENTS: Referring to FIG. 3, devices 26, 28, and 30 are labeled server, mobile device, and local device respectively. These labels are used for convenience only to represent a typical shared data environment. Device 26 need not be a server, device 28 need not be mobile, and device 30 need not be local. Server 26 includes server application 36 and server data store 38. Mobile device 28 includes mobile application 40 and mobile data store 42. Local device 30 includes local application 44 and local data store 46. Applications 36, 40, and 44 each represent generally an e-mail client, electronic calendar, a task list, an electronic address book, or any other application capable of sharing data. Data stores 38, 42, and 46 represent logical memory for storing electronic records used by applications 36, 40, and 44 respectively. Each record contained in data stores 38, 42, and 46 typically represents a discrete item of shared data such as an e-mail, an appointment, a task, an address, or even a word processing or spreadsheet file. While FIG. 3 illustrates devices 26, 28, and 30 as containing one shared data application 36, 40, and 44 respectively and one data store 38, 42, and 46 respectively, these devices can each contain any number of applications and data stores. Moreover, a given data store 38, 42, and/or 46 need not be located on the same device containing the application using the particular data store. The application in question need only be able to access the particular data store.

Server 26 includes server synch engine 48 and server adapter 52 while local device 30 includes local synch engine 50 and local adapter 54. Mobile device 28 includes mobile adapter 56. Server synch engine 48 represents generally any programming capable of synchronizing records in server data store 38, mobile data store 42, and local data store 46. Local synch engine 50 represents generally any programming capable of synchronizing records in local data store 46 and mobile data store 42. When contained in given data store 38, 42, or 46, each record is stored in a format native to a corresponding application 36, 40, or 44. Records in different data stores can be and are often stored in differing formats. Server adapter 52, associated with server data store 38, represents generally any programming capable of reading and writing records in the format required by server application 36. Local adapter 54, associated with local data store 46, represents generally any programming capable of reading and writing records in the format required by local application 44, while mobile adapter, associated with mobile data store 42, represents generally any programming capable of reading and writing records in the format required by mobile application 40. Adapters 52, 54 and 56 are each also capable of monitoring its associated data store 38, 42, or 46 to detect updates to the records in the data store.

Devices 26, 28, and 30 also include databases 58, 60, and 62. Server database 58 represents logical memory for storing electronic data used by server synch engine 48 and server adapter 52 to perform their respective functions, while local database 60 represents logical memory for storing electronic data used by local synch engine 50 and local adapter 54 to perform their respective functions. Mobile database 62 represents logical memory for storing electronic data used by mobile adapter 56 in performance of its functions.

Referring now to FIGS. 4-6, server, local, and mobile databases 58, 60, and 62 each include change log table 63, 64 and 65. Each change log table 63, 64 and 65 includes electronic data reflecting changes to records in a given data store 38, 42, and 46. Server and local databases 58 and 60 each include contracts tables 66 and 67 and synch status tables 68 and 69. Contracts tables 66 and 67 include electronic data used by synch engines 48 and 50 to identify data stores 38, 42, and/or 46 that are involved in a particular synchronization operation. Synch status tables 68 and 69 include electronic data reflecting the status of records following a previous synchronization.

FIG. 7 illustrates the logical contents of change log tables 63, 64 and 65 shown in separate instances in FIGS. 4-6. The change log tables 63, 64 and 65 in databases 58, 60, and 62 each contain an entry associated with each record in a particular data store 38, 42, or 46. Each change log table entry is used to identify a particular record and to reflect updates, if any, made to that record. Server, local, and mobile adapters 52, 54, and 56 are responsible for managing the entries each of which includes global identifier field 70, record identifier field 72, change counter field 74, and status field 76.

Global identifier field 70 contains data (global identifier) uniquely identifying a record across all devices 26, 28, and 30. When a given record is synchronized in data stores 38, 42, and 46, the entry associated with the record in the change log tables 63, 64 and 65 in databases 60, 62, and 64 each contain identical global identifiers. Record identifier field 72 contains data (record identifier) uniquely identifying a particular record within a given data store 38, 42, or 46. In most cases, the record identifier for a particular record in one database will be different than the record identifier for the same record in another database. Change counter field 74 contains data (change counter) reflecting a running counter revealing the number of times a given data store 38, 42, or 46 has been updated. A data store is updated when a record is added to, modified within, or deleted from the data store. A record is updated when it is added to, modified within, or deleted from a data store. When the first record is created or introduced to the data store 38, 42, or 46, the record's change counter may be set to zero. When a second record is introduced, its change counter is set to one. When the first record is altered, its change counter is set to two. When the second record is deleted, its change record is set to three. The progression increases for each update made to the data store 38, 42, or 46. Typical status indicators reflect that a given record is new, modified, or deleted.

FIGS. 8 and 9 illustrate the logical contents of contracts tables 66 and 67 in server and local databases 58 and 60. Each contracts table 66, 67 contains entries utilized by a particular synch engine 48 or 50 to identify the adapters 52, 54, and/or 56 and data stores 38, 42, and/or 46 involved in a given synchronization operation. Each entry includes a user identification field 78, contract identification field 80, adapter identification field 82, and data store identification field 84. Adapter identification field 82 contains data (adapter identifier) identifying the adapter 52, 54, or 56 responsible for monitoring a given data store 38, 42, or 46. Data store identification field 84 contains data (data store identifier) identifying the data store 38, 42, or 46 being monitored by the adapter 52, 54, or 56 identified by the adapter identifier in a given contracts table entry.

FIGS. 10 and 11 illustrate the logical contents of synch status tables 68 and 69 in server and local databases 58 and 60. Each synch status table 68 and 69 contains one or more entries utilized by a particular synch engine 48 or 50 to synchronize records between two data stores 38 and 42, 38 and 46, or 42 and 46. Each entry contains contract identifier field 86, first adapter identification field 88, first maximum change counter field 90, second adapter identification field 92, and second maximum change counter field 94. First and second adapter identification fields 88 and 92 contain data (first and second adapter identifiers) identifying the adapters 52 and 54, 52 and 56, or 54 and 56 responsible for monitoring the data stores 38 and 42, 38 and 46, or 42 and 46. First maximum change counter field 90 contains the value of the highest change counter found in the change log table 64 managed by the adapter 52, 54, or 56 which is identified by the first adapter identifier. This value is set following a previous synchronization operation. Similarly, second maximum change counter field 94 contains the value of the highest change counter found in the change log table 64 managed by the adapter 52, 54, or 56 which is identified by the second adapter identifier. Again, this value is set following a previous synchronization operation.

The block diagrams of FIGS. 2-11 show the architecture, functionality, and operation of one implementation of the present invention. If embodied in software, each block in FIG. 3 may represent a module, segment, or portion of code that comprises one or more executable instructions to implement the specified logical function(s). If embodied in hardware, each block in FIG. 3 may represent a circuit or a number of interconnected circuits to implement the specified logical function(s). The particular data provided for the fields of each table illustrated in FIGS. 7-11 is illustrative only.

Also, the invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain the programming of the present invention for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 12:
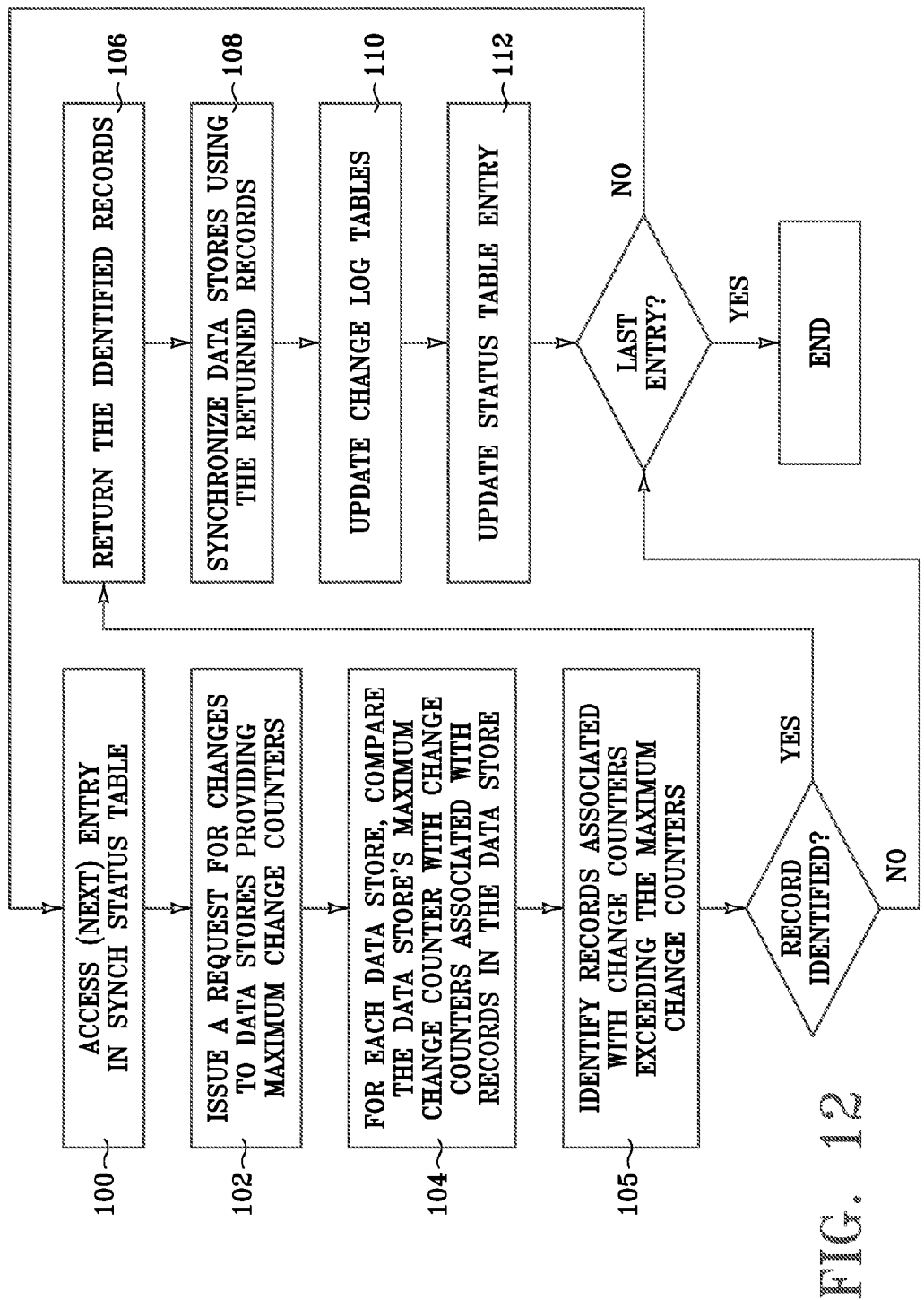
FIG. 12 is a flow chart illustrating steps taken to synchronize two data stores according to one embodiment of the present invention.

OPERATION: A synchronization operation will now be described with reference to the block diagrams of FIGS. 2-11 and the flow diagram of FIG. 12. FIG. 12 provides an example of the steps taken utilizing server synch engine 48 or local synch engine 50 to synchronize any two data stores 38 and 42, 38 and 46, or 42 and 46. These steps are described below with reference to local synch engine 50.

Local synch engine 50 accesses an entry in synch status table 69 found in local database 60 (step 100). As described above, the synch status table entry includes a first adapter identifier 88 with a corresponding first maximum change counter 90 and a second adapter identifier 92 with a corresponding second maximum change counter 94. Synch engine 50 issues a request to the adapters, 54 and 56 in this example, identified by the first and second adapter identifiers 88 and 92 for any updates made to the corresponding data stores 42 and 46 (step 102). For example, using the local database synch status table shown in FIG. 11, synch engine 50 would send the request out to local adapter 54 which is identified by first adapter identifier 88 and to mobile adapter 56 which is identified by second adapter identifier 92. The request from synch engine 50 to adapters 54 and 56 includes the first maximum change counter 90 and the second maximum change counter 94.

Next, the adapters, local adapter 54 and mobile adapter 56 in this example, each identify any updates to their data stores 46 and 42 by comparing the maximum change counter 90 or 94 received from synch engine 50 to the change counters 74 in their respective change log tables 64 and 65 (step 104). Each adapter 54 and 56 identifies change counters for records in data store 42 or 46 that exceed the maximum change counter for the adapter 54 and 56 (step 105). If any change counter 74 exceeds the maximum change counter for that adapter 54 or 56, then the record associated with that change counter has been updated since the previous synchronization. Any record associated with a change counter less than or equal to the maximum change counter has not been updated since the previous synchronization.

If the comparisons above reveal that no records have been updated since a previous synchronization, then the process repeats with step 100 if synch status table 69 contains another entry. Otherwise the process stops. If the comparisons above reveal that records have been updated since a previous synchronization, then adapters 54 and 56 return updated records along with their status 76 and global identifiers 70 to local synch engine 50 (step 106), unless the update is a deleted record, in which case adapters 54 and 56 return only the deleted record's status and global identifier.

Using each returned record, status, and global identifier, synch engine 50 synchronizes the data stores 42 and 46 associated with the adapters 54 and 56 and identified by the synch status table entry obtained in step 100 (step 108). To do so, synch engine 50 sends each record, with its status and global identifier (or just the global identifier and status for deleted records) returned by the first adapter 54 or 56 (identified by the first adapter identifier) to the second adapter 56 or 5456 (identified by the second adapter identifier) along with instructions to update the data store associated with the second adapter 56 or 54 accordingly. Next, synch engine 50 sends each record with its status and global identifier (or just the global identifier and status for deleted records) returned by the second adapter 56 or 54 to the first adapter 54 or 56 along with instructions to update the data store associated with the first adapter 54 or 56 accordingly.

The following describes how records might be updated based upon the record status of each:

Where the status of a record retrieved from one data store 42 or 46 and returned in step 106 indicates that the returned record has been modified while the status of a corresponding record (a record having the same global identifier as the returned record) in a second data store 46 or 42 indicates that the corresponding record is new or unchanged, the adapter 54 or 56 associated with the second data store 46 or 42, in step 108, modifies the corresponding record to match the returned record. Alternatively, in step 108 that adapter 56 or 52 may replace the corresponding record with the returned record.

Where the status of a record retrieved from one data store 42 or 46 and returned in step 106 indicates that the returned record has been deleted and the status of a corresponding record (a record having the same global identifier as the returned record) in a second data store 46 or 42 indicates that the corresponding record is new or unchanged, the adapter 54 or 56 associated with the second data store, in step 108, deletes the corresponding record.

Where the status of a record retrieved from one data store 42 or 46 and returned in step 106 indicates that the returned record has been modified and the status of a corresponding record (a record having the same global identifier as the returned record) in a second data store 46 or 42 indicates that the corresponding record has also been modified, the adapter 54 or 56 associated with the second data store 46 or 42, in step 108, modifies or updates the corresponding record according to a predetermined set of conflict rules; and Where the status of a record returned in step 106 indicates that it is new, there will not be a corresponding record in the data store 42 or 46 to be updated in step 108. In this case, the adapter 54 or 56 associated with the data store 42 or 46 to be updated replicates the new record in that data store 42 or 46.

Once synch engine 50 completes step 108, the adapters 54 and 56 involved in step 108 each updates its associated change log table 64 or 65 to reflect actions taken (step 110). Where a given record is updated (added, modified, or deleted) in step 108, its change log table entry is revised so that the status field 76 for the entry reflects the update. The change counter field 74 for that entry is also updated to reflect that one more change has been made to the data store 38, 42, or 46 containing the updated record. Next, synch engine 50 updates the synch status table entry accessed in step 100 (step 112). More specifically, synch engine 50 updates the values for the first and second maximum change counter fields 90 and 94 to reflect the values of the highest change counters in the change log tables 64 and 65 updated in step 110. If the synch status table 69 accessed in step 100 contains another entry, the synchronization operation repeats with step 100. Otherwise, the operation ends.

Although the flowcharts of FIG. 12 show a specific order of execution, the order of execution may differ from that which is depicted. For example, the order of execution of two or more blocks may be scrambled relative to the order shown. Also, two or more blocks shown in succession in FIG. 12 may be executed concurrently or with partial concurrence. All such variations are within the scope of the present invention.

EXAMPLES

Synchronization will now be discussed in relation to three events. Thee first event involves adding a new record to server data store 38. The second involves modifying an existing record in local data store 46. The third event involves adding a new record to local data store 46 and deleting a record from mobile data store 42. Beginning with the first event, following the addition of the new record to server data store 38, server adapter 52 generates an entry for the new record in change log table 63 in server database 58 having a change counter exceeding the change counter for the last record updated in data store 38. Apart from the new record, data stores 38, 42, and 46 are synchronized. Server database 58 contains the following tables with the following entries:

Contracts Table (Server Database)

| User Identifier | Contract Identifier | Adapter Identifier | Data Store Identifier |
|---|---|---|---|
| John Doe | 12345 | Server Adapter | Server Data Store |
| John Doe | 12345 | Local Adapter | Local Data Store |
| John Doe | 12345 | Mobile Adapter | Mobile Data Store |

Synch Status Table (Server Database)

| Contract Identifier | First Adapter Identifier | First Maximum Change Counter | Second Adapter Identifier | Second Maximum Change Counter |
|---|---|---|---|---|
| 12345 | Server Adapter | 100 | Local Adapter | 200 |
| 12345 | Server Adapter | 100 | Mobile Adapter | 400 |

Change Log Table (Server Database)

| Global Identifier | Record Identifier | Change Counter | Status |
|---|---|---|---|
| FRTYDSAW | Server Record 2 | 101 | NEW |
| QWERTY | Server Record 1 | 100 | MODIFY |

As can be seen from the contracts table 66, server synch engine 48 is responsible for synchronizing for server, local, and mobile data stores 38, 42, and 46 using adapters 52, 54, and 56 for the user John Doe. The first entry in the synch status table 68 indicates that following a previous synchronization server adapter 52 reported that the maximum change counter in change log table 63 in server database 58 had a value of one hundred while local adapter 54 reported that the maximum change counter in change log table 64 in local database 60 had a value of two hundred. The second entry in the synch status table 68 indicates that following a previous synchronization server adapter 52 reported that the maximum change counter in change log table 63 in server database 58 had a value of one hundred while mobile adapter 54 reported that the maximum change counter in change log table 65 in mobile database 62 had a value of four hundred. The two entries in change log table 63 reveal that server data store 38 contains two records, one having a status of NEW and a change counter of one hundred one and the other a status of MODIFY and a change counter of one hundred.

Local database 60 contains the following tables with the following entries:

| Contracts Table (Local Database) | | | |
|---|---|---|---|
| User Identifier | Contract Identifier | Adapter Identifier | Data Store Identifier |
| John Doe | 12345 | Local Adapter | Local Data Store |
| John Doe | 12345 | Mobile Adapter | Mobile Data Store |

| Synch Status Table (Local Database) | | | | |
|---|---|---|---|---|
| Contract Identifier | First Adapter Identifier | First Maximum Change Counter | Second Adapter Identifier | Second Maximum Change Counter |
| 12345 | Local Adapter | 200 | Mobile Adapter | 400 |

| Change Log Table (Local Database) | | | |
|---|---|---|---|
| Global Identifier | Record Identifier | Change Counter | Status |
| QWERTY | Local Record 1 | 200 | MODIFY |

As can be seen from the contracts table 67, local synch engine 50 is responsible for synchronizing mobile and local data stores 42 and 46 using adapters 54 and 56 for the user John Doe. The first and only entry in the synch status table 69 indicates that following a previous synchronization local adapter 54 reported that the maximum change counter in change log table 64 in local database 60 had a value of two hundred while mobile adapter 56 reported that the maximum change counter in change log table 65 in mobile database 62 had a value of four hundred. The single entry in change log table 64 reveals that local data store 46 contains one record having a status of MODIFY and a change counter of two hundred.

Mobile database 62 contains the following change log table 64:

| Change Log Table (Mobile Database) | | | |
|---|---|---|---|
| Global Identifier | Record Identifier | Change Counter | Status |
| QWERTY | Mobile Record 1 | 400 | MODIFY |

The change log table 65 indicates that mobile data store 42 contains one record having a status of MODIFY and a change counter of four hundred.

When the user John Doe initiates server synch engine 48, server synch engine 48 accesses the first entry from the synch status table 68 in server database 58 (step 100). Sending the first maximum change counter to server adapter 52 (identified by the first adapter identifier) and the second maximum change counter to local adapter 54 (identified by the second adapter identifier), server synch engine 48 issues a request for adapters 52 and 54 to respond with updates to data stores 38 and 46 (step 102). Using the maximum change counters, adapters 52 and 54 identify changes to data stores 38 and 46 that occurred after a previous synchronization (step 104). Local adapter 54 compares the second maximum change counter it received from server synch engine 48 with the change counters in change log table 64 in local database 60. The comparison reveals that the second maximum change counter is not exceeded by a change counter in change log table 64. Consequently, local adapter 54 responds to server synch engine 48 that no changes have been made in local data store 46.

Server adapter 52 compares the first maximum change counter it received from server synch engine 48 with the change counters in change log table 63 in server database 58. The comparison reveals that the second maximum change counter is exceeded by a change counter in change log table 63 in server database 58. Specifically, the change log table 63 contains one entry having a change counter exceeding the first maximum change counter. Server adapter 52 then recognizes that the record in server data store 38 associated with that change log table entry has been updated since the previous synchronization. Examining the status field 76 for that table entry reveals that the record is new to server data store 38. Consequently, server adapter 52 retrieves the new record from server data store 38 and returns the record along with its status and global identifier to synch engine 48 (step 106).

Using the returned record, its status, and global identifier, server synch engine 48 synchronizes data stores 38 and 46 (step 108). As the returned record's status indicates that it is new, server synch engine 48 sends the record to local adapter 54 with instructions to replicate the record in local data store 46. Once local adapter 54 complies with the instructions and replicates the new record in local data store 46, local adapter 54 updates change log table 64 in local database 60 (step 110). Local adapter 54 adds a new entry associated with the new record in change log table 64 which now contains the following entries:

Change Log Table (Local Database)

| Global Identifier | Record Identifier | Change Counter | Status |
|---|---|---|---|
| FRTYDSAW | Local Record 2 | 201 | NEW |
| QWERTY | Local Record 1 | 200 | MODIFY |

The new entry uses the same global identifier associated with the record in server data store 38. The change counter for the entry is two hundred one—one greater than the previous entry.

Server synch engine 48 then updates the first entry in synch status table 68 accessed in step 100 updating the first and second maximum change counters (step 112). Updated synch status table 68 in server database 58 now contains the following entries:

Synch Status Table (Server Database)

| Contract Identifier | First Adapter Identifier | First Maximum Change Counter | Second Adapter Identifier | Second Maximum Change Counter |
|---|---|---|---|---|
| 12345 | Server Adapter | 101 | Local Adapter | 201 |
| 12345 | Server Adapter | 100 | Mobile Adapter | 400 |

The first entry now contains updated first and second maximum change counters that if compared (step 104) with change counters in change log tables 63 and 64 in server and local databases 58 and 60 would reveal that server and local data stores 38 and 46 are synchronized.

Because synch status table 68 in server database 58 contains a second entry the process repeats with server synch engine 48 accessing the second entry (step 100). Sending the first maximum change counter to server adapter 52 (identified by the first adapter identifier) and the second maximum change counter to mobile adapter 56 (identified by the second adapter identifier), server synch engine 48 issues a request for adapters 52 and 56 to respond with changes to data stores 38 and 42 (step 102). Using the maximum change counters, adapters 52 and 56 identify changes to data stores 38 and 42 that occurred after a previous synchronization (step 104). Mobile adapter 56 compares the second maximum change counter it received from server synch engine 48 with the change counters in change log table 65 in mobile database 62. The comparison reveals that the second maximum change counter is not exceeded by a change counter in change log table 65. Consequently, mobile adapter 56 responds to server synch engine 48 that no changes have been made in mobile data store 42.

Server adapter 52 compares the first maximum change counter it received from server synch engine 48 with the change counters in change log table 63 in server database 58. The comparison reveals that the second maximum change counter is exceeded by a change counter in change log table 63 in server database 58. Specifically, the change log table 63 contains one entry having a change counter exceeding the first maximum change counter. Server adapter 52 then recognizes that the record in server data store 38 associated with the change log table entry has been updated since the previous synchronization. Examining the status field 76 for that table entry reveals that the record is new to server data store 38. Consequently, server adapter 52 retrieves the new record from server data store 38 and returns the record along with its status and global identifier to server synch engine 48 (step 106).

Using the returned record, and its status and global identifier, server synch engine 48 synchronizes data stores 38 and 42 (step 108). As the returned record's status indicates that it is new, server synch engine 48 sends the record to mobile adapter 56 with instructions to replicate the record in mobile data store 42. Once mobile adapter 56 complies with the instructions and replicates the new record in mobile data store 42, mobile adapter 56 updates change log table 65 in mobile database 62 (step 110). Mobile adapter 56 adds a new entry associated with the new record in change log table 65 which now contains the following entries:

Change Log Table (Mobile Database)

| Global Identifier | Record Identifier | Change Counter | Status |
|---|---|---|---|
| FRTYDSAW | Mobile Record 2 | 401 | NEW |
| QWERTY | Mobile Record 1 | 400 | MODIFY |

The new entry uses the same global identifier associated with the record in server data store 38. The change counter for the entry is four hundred one—one greater than the previous entry.

Server synch engine 48 then updates the second entry in synch status table 68 accessed in step 100 updating the first and second maximum change counters (step 112). Updated synch status table 68 in server database 58 now contains the following entries:

Synch Status Table (Server Database)

| Contract Identifier | First Adapter Identifier | First Maximum Change Counter | Second Adapter Identifier | Second Maximum Change Counter |
|---|---|---|---|---|
| 12345 | Server Adapter | 101 | Local Adapter | 201 |
| 12345 | Server Adapter | 101 | Mobile Adapter | 401 |

The second entry now contains updated first and second maximum change counters that if compared (step 104) with change log tables 63 and 65 in server and mobile databases 58 and 62 would reveal that server and mobile data stores 38 and 42 are synchronized. Because synch status table 68 in server database 58 contains no more entries, server synch engine 48 quits.

When the user John Doe initiates local synch engine 50, local synch engine 50 accesses the first (and only) entry from the synch status table 69 in local database 60 (step 100). Sending the first maximum change counter to local adapter 54 (identified by the first adapter identifier) and the second maximum change counter to mobile adapter 56 (identified by the second adapter identifier), local synch engine 50 issues a request for adapters 54 and 56 to respond with changes to data stores 46 and 42 (step 102). Using the maximum change counters, adapters 54 and 56 identify changes to data stores 46 and 42 that occurred after a previous synchronization (step 104). Local adapter 54 compares the first maximum change counter it received from local synch engine 50 with the change counters in change log table 64 in local database 60. The comparison reveals that the first maximum change counter is exceeded. Specifically, the change log table 64 contains one entry having a change counter exceeding the first maximum change counter. Local adapter 54 then recognizes that the record in local data store 46 associated with the change log table entry has been updated since the previous synchronization. Examining the status field 76 for that entry reveals that the record is new to local data store 46. Consequently, local adapter 54 retrieves the new record from local data store 46 and returns the record along with its status and global identifier to local synch engine 50 (step 106).

Mobile adapter 56 compares the second maximum change counter it received from local synch engine 50 with the change counters in change log table 65 in mobile database 62. The comparison reveals that the second maximum change counter is exceeded. Specifically, the change log table 65 contains one entry having a change counter exceeding the second maximum change counter. Mobile adapter 56 then recognizes that the record in mobile data store 42 associated with the change log table entry has been updated since the previous synchronization. Examining the status field 76 for that entry reveals that the record is new to mobile data store 42. Consequently, mobile adapter 56 retrieves the new record from mobile data store 42 and returns the record along with its status and global identifier to local synch engine 50 (step 106).

Using the returned records, their status and global identifiers, local synch engine 50 synchronizes data stores 46 and 42 (step 108). Local synch engine 50 compares the returned global identifiers. Finding the identifiers to be identical, local synch engine 50 determines that the same record is new to both data stores 46 and 42. Consequently, local synch engine 50 determines that local and mobile data stores 46 and 42 are already synchronized and sends no further instructions to local and mobile adapters 54 and 56. Consequently, change log tables 64 and 65 in local and mobile databases 60 and 62 need not be updated (step 110). Local synch engine 50 does, however, update synch status table 69 in local database 60 (step 112). Updated synch status table 69 in local database 60 now contains the following entry:

| | | Synch Status Table (Local Database) | | |
|---|---|---|---|---|
| Contract Identifier | First Adapter Identifier | First Maximum Change Counter | Second Adapter Identifier | Second Maximum Change Counter |
| 12345 | Local Adapter | 201 | Mobile Adapter | 401 |

The entry now contains updated first and second maximum change counters that if compared (step 104) with change log tables 64 and 65 in local and mobile databases 60 and 62 would reveal that local and mobile data stores 46 and 42 are synchronized. As there is only one entry in synch status table 69 in local database 60, local synch engine 50 quits. Data stores 38, 42, and 46 are now synchronized.

Moving to the second event, a record is modified in local data store 46, and local adapter 54 updates the entry for that record in change log table 64 in local database 60. Change log table 64 in local database 60 contains the following entries:

| Change Log Table (Local Database) | | | |
|---|---|---|---|
| Global Identifier | Record Identifier | Change Counter | Status |
| FRTYDSAW | Local Record 2 | 201 | NEW |
| QWERTY | Local Record 1 | 202 | MODIFY |

Local adapter 54 has updated the second entry in change log table 64 above to reflect the modification made to the record associated with the entry. The change counter was increased to two hundred two, one more than the previous maximum and the record's status was set to modify.

When the user John Doe initiates server synch engine 48, server synch engine 48 accesses the first entry from the synch status table 68 in server database 58 (step 100). Sending the first maximum change counter to server adapter 52 (identified by the first adapter identifier) and the second maximum change counter to local adapter 54 (identified by the second adapter identifier), server synch engine 48 issues a request for adapters 52 and 54 to respond with changes to data stores 38 and 46 (step 102). Using the maximum change counters, adapters 52 and 54 identify changes to data stores 38 and 46 that occurred after a previous synchronization (step 104).

Local adapter 54 compares the second maximum change counter it received from server synch engine 48 with the change counters in change log table 64 in local database 60. The comparison reveals that the second maximum change counter is exceeded by a change counter in change log table 64. Specifically, the change log table 64 contains one entry having a change counter of two hundred two exceeding the first maximum change counter of two hundred one. Local adapter 54 then recognizes that the record in local data store 46 associated with the change log table entry has been updated since the previous synchronization. Examining the status field 76 for that entry reveals that the record has been modified in local data store 46. Consequently, local adapter 54 retrieves the modified record from local data store 46 and returns the record along with its status and global identifier to server synch engine 48 (step 106).

Server adapter 52 compares the first maximum change counter it received from server synch engine 48 with the change counters in change log table 63 in server database 58. The comparison reveals that the second maximum change counter is not exceeded by a change counter in change log table 63 in server database 58. Consequently, server adapter 52 responds to server synch engine 48 that no changes have been made in server data store 38 (step 106).

Using the returned record, its status and global identifier, server synch engine 48 synchronizes data stores 38 and 46 (step 108). As the returned record's status indicates that it is modified, server synch engine 48 sends the record to server adapter 52 with instructions to modify the corresponding record—the record having the same global identifier as the modified record—in server data store 38. Once server adapter 52 complies, server adapter 52 updates change log table 63 in server database 58 (step 110). Server adapter 52 updates the entry in change log table 63 for the record modified in server database 58. Change log table 63 now contains the following entries:

Change Log Table (Server Database)

| Global Identifier | Record Identifier | Change Counter | Status |
|---|---|---|---|
| FRTYDSAW | Server Record 2 | 101 | NEW |
| QWERTY | Server Record 1 | 102 | MODIFY |

The updated entry now has a change counter of one hundred two, one more than the previous maximum value. The status for the entry is set to modify.

Server synch engine 48 then updates the first entry in synch status table 68 accessed in step 100 updating the first and second maximum change counters (step 112). Updated synch status table 68 in server database 58 now contains the following entries:

Synch Status Table (Server Database)

| Contract Identifier | First Adapter Identifier | First Maximum Change Counter | Second Adapter Identifier | Second Maximum Change Counter |
|---|---|---|---|---|
| 12345 | Server Adapter | 102 | Local Adapter | 202 |
| 12345 | Server Adapter | 101 | Mobile Adapter | 401 |

The first entry now contains updated first and second maximum change counters that if compared (step 104) with change log tables 63 and 64 in server and local databases 58 and 60 would reveal that server and local data stores 38 and 46 are synchronized.

Because synch status table 68 in server database 58 contains a second entry the process repeats with server synch engine 48 accessing the second entry (step 100). Sending the first maximum change counter to server adapter 52 (identified by the first adapter identifier) and the second maximum change counter to mobile adapter 56 (identified by the second adapter identifier), server synch engine 48 issues a request for adapters 52 and 56 to respond with changes to data stores 38 and 42 (step 102). Using the maximum change counters, adapters 52 and 56 identify changes to data stores 38 and 42 that occurred after a previous synchronization (step 104). Mobile adapter 56 compares the second maximum change counter it received from server synch engine 48 with the change counters in change log table 65 in mobile database 62. The comparison reveals that the second maximum change counter is not exceeded by a change counter in change log table 65. Consequently, mobile adapter 56 responds to server synch engine 48 that no changes have been made in mobile data store 42.

Server adapter 52 compares the first maximum change counter it received from server synch engine 48 with the change counters in change log table 63 in server database 58. The comparison reveals that the second maximum change counter is exceeded by a change counter in change log table 63 in server database 58. Specifically, the change log table 63 contains one entry having a change counter of one hundred two which exceeds the first maximum change counter of one hundred one. Server adapter 52 then recognizes that the record in server data store 38 associated with the change log table entry has been updated since the previous synchronization. Examining the status field 76 for that entry table reveals that the record has been modified in server data store 38. Consequently, server adapter 52 retrieves the modified record from server data store 38 and returns the record along with its status and global identifier to server synch engine 48 (step 106).

Using the returned record and its status, server synch engine 48 synchronizes data stores 38 and 42 (step 108). As the returned record's status indicates that it is modified, server synch engine 48 sends the record to mobile adapter 56 with instructions to modify the corresponding record—the record having the same global identifier—in mobile data store 42 accordingly. Once mobile adapter 56 complies mobile adapter 56 updates change log table 65 in mobile data base 62 (step 110). Mobile adapter 56 updates the entry associated with the new record in change log table 65 which now contains the following entries:

Change Log Table (Mobile Database)

| Global Identifier | Record Identifier | Change Counter | Status |
|---|---|---|---|
| FRTYDSAW | Mobile Record 2 | 401 | NEW |
| QWERTY | Mobile Record 1 | 402 | MODIFY |

The change counter for the entry is four hundred two—one greater then the previous maximum and the status is set to modify.

Server synch engine 48 then updates the second entry in synch status table 68 accessed in step 100 updating the first and second maximum change counters (step 112). Updated synch status table 68 in server database 58 now contains the following entries:

Synch Status Table (Server Database)

| Contract Identifier | First Adapter Identifier | First Maximum Change Counter | Second Adapter Identifier | Second Maximum Change Counter |
|---|---|---|---|---|
| 12345 | Server Adapter | 102 | Local Adapter | 202 |
| 12345 | Server Adapter | 102 | Mobile Adapter | 402 |

The second entry now contains updated first and second maximum change counters that if compared (step 104) with change log tables 63 and 65 in server and mobile databases 58 and 52 would reveal that server and mobile data stores 38 and 42 are synchronized. Because synch status table 68 in server database 58 contains no more entries, server synch engine 48 quits.

When the user John Doe initiates local synch engine 50, local synch engine 50 accesses the first (and only) entry from the synch status table 69 in local database 60 (step 100). Sending the first maximum change counter to local adapter 54 (identified by the first adapter identifier) and the second maximum change counter to mobile adapter 56 (identified by the second adapter identifier), local synch engine 50 issues a request for adapters 54 and 56 to respond with changes to data stores 46 and 42 (step 102). Using the maximum change counters, adapters 54 and 56 identify changes to data stores 46 and 42 that occurred after a previous synchronization (step 104). Local adapter 54 compares the first maximum change counter it received from local synch engine 50 with the change counters in change log table 64 in local database 60. The comparison reveals that the first maximum change counter is exceeded. Specifically, the change log table 64 contains one entry having a change counter of two hundred two exceeding the first maximum change counter of two hundred one. Local adapter 54 then recognizes that the record in local data store 46 associated with the change log table entry has been updated since the previous synchronization. Examining the status field 76 for that entry reveals that the record has been modified in local data store 46. Consequently, local adapter 54 retrieves the modified record from local data store 46 and returns the record along with its status and global identifier to local synch engine 50 (step 106).

Mobile adapter 56 compares the second maximum change counter it received from local synch engine 50 with the change counters in change log table 65 in mobile database 62. The comparison reveals that the second maximum change counter is exceeded. Specifically, the change log table 65 contains one entry having a change counter of four hundred two exceeding the second maximum change counter of four hundred one. Mobile adapter 56 then recognizes that the record in mobile data store 42 associated with the change log table entry has been updated since the previous synchronization. Examining the status field 76 for that entry reveals that the record has been modified in mobile data store 42. Consequently, mobile adapter 56 retrieves the modified record from mobile data store 52 and returns the record along with its status and global identifier to local synch engine 50 (step 106).

Using the returned records, their status and global identifiers, local synch engine 50 synchronizes data stores 42 and 46 (step 108). Local synch engine 50 compares the returned global identifiers. Finding the local identifiers to be identical, local synch engine 50 concludes that the same record has been returned by both adapters 54 and 56. As the returned records' status indicates that they are both modified, local synch engine 50 then compares the records' contents and determines that they contain the same data. Each record may be in a different format, but still contain the same data. Because the records are the same, local synch engine 50 determines that local and mobile data stores 46 and 42 are already synchronized and sends no further instructions to local and mobile adapters 54 and 56. Consequently, change log tables 64 and 65 in local and mobile databases 60 and 62 need not be updated (step 110). Local synch engine 50 does, however update synch status table 69 in local database 60 (step 112). Updated synch status table 69 in local database 60 now contains the following entries:

| Synch Status Table (Local Database) | | | | |
|---|---|---|---|---|
| Contract Identifier | First Adapter Identifier | First Maximum Change Counter | Second Adapter Identifier | Second Maximum Change Counter |
| 12345 | Local Adapter | 202 | Mobile Adapter | 402 |

The first entry now contains updated first and second maximum change counters that if compared (step 104) with change log tables 64 and 65 in local and mobile databases 60 and 62 would reveal that local and mobile data stores 46 and 42 are synchronized. As there is only one entry on synch status table 69 in local database 60, local synch engine 50 quits. Data stores 38, 42, and 46 are once again synchronized.

Moving on to the third event, a new record is added to local data store 46 and a record is deleted from mobile data store 42. Following these actions, local adapter 54 adds an entry for the new record to change log table 64 in local database 60, while mobile adapter 56 modifies the entry associated with the deleted record in change log table 65 in mobile database 62. Change log table 64 in local database 60 now contains the following three entries:

| Change Log Table (Local Database) | | | |
|---|---|---|---|
| Global Identifier | Record Identifier | Change Counter | Status |
| ZXCVB | Local Record 3 | 203 | NEW |
| FRTYDSAW | Local Record 2 | 201 | NEW |
| QWERTY | Local Record 1 | 202 | MODIFY |

The entry associated with the new record has a new global identifier, ZXCVB, a change counter of two hundred three (one more than the previous maximum), and a status indicating that the associated record is in fact new.

Change log table 65 in mobile database 62 now contains the following two entries:

| Change Log Table (Mobile Database) | | | |
|---|---|---|---|
| Global Identifier | Record Identifier | Change Counter | Status |
| FRTYDSAW | Mobile Record 2 | 401 | NEW |
| QWERTY | Mobile Record 1 | 403 | DELETED |

The entry associated with the deleted record has a change counter of four hundred three (one more than the previous maximum) and a status reflecting that the associated record has in fact been deleted.

In this instance, the user John Doe initiates local synch engine 50, local synch engine 50 then accesses the first (and only) entry from the synch status table 69 in local database 60 (step 100). Sending the first maximum change counter to local adapter 54 (identified by the first adapter identifier) and the second maximum change counter to mobile adapter 56 (identified by the second adapter identifier), local synch engine 50 issues a request for adapters 54 and 56 to respond with changes to data stores 46 and 42 (step 102). Using the maximum change counters, adapters 54 and 56 identify changes to data stores 46 and 42 that occurred after a previous synchronization (step 104). Local adapter 54 compares the first maximum change counter it received from local synch engine 50 with the change counters in change log table 64 in local database 60. The comparison reveals that the second maximum change counter is exceeded by a change counter in change log table 64. Specifically, the change log table 64 contains one entry having a change counter of two hundred three exceeding the first maximum change counter of two hundred two. Local adapter 54 then recognizes that the record in local data store 46 associated with the change log table entry has been updated since the previous synchronization. Examining the status field 76 for that entry reveals that the record is new to local data store 46. Consequently, local adapter 54 retrieves the new record from local data store 46 and returns the record along with its status and global identifier to local synch engine 50 (step 106).

Mobile adapter 56 compares the second maximum change counter it received from local synch engine 50 with the change counters in change log table 65 in mobile database 62. The comparison reveals that the second maximum change counter is exceeded by a change counter in change log table 65 in mobile database 62. Specifically, the change log table 65 contains one entry having a change counter of four hundred three exceeding the second maximum change counter of four hundred two. Mobile adapter 56 then recognizes that the record in mobile data store 42 associated with the change log table entry has been updated since the previous synchronization. Examining the status field 76 for that entry reveals that the record has been deleted from mobile data store 42. Consequently, mobile adapter 56 returns the global identifier and status for the deleted record to local synch engine 50 (step 106).

Local synch engine 50 synchronizes data stores 42 and 46 (step 108). As the status of the record returned by local adapter 54 indicates that the returned record is new, local synch engine 50 sends the record to mobile adapter 56 with instructions to replicate the record in mobile data store 42. Once mobile adapter 56 complies with the instructions and replicates the new record in mobile data store 42, mobile adapter 56 updates change log table 65 in mobile database 62 (step 110). Mobile adapter 56 adds a new entry associated with the new record in change log table 65 which now contains the following entries:

| Change Log Table (Mobile Database) | | | |
|---|---|---|---|
| Global Identifier | Record Identifier | Change Counter | Status |
| ZXCVB | Mobile Record 3 | 404 | NEW |
| FRTYDSAW | Mobile Record 2 | 402 | NEW |
| QWERTY | Mobile Record 1 | 403 | DELETED |

Mobile adapter 56 has added a new entry in change log table 65 for the new record replicated in mobile data store 42. The entry contains the same global identifier as the new record added to local data store 46. The change counter is set to four hundred four, and the status is set to new.

As the information returned by mobile adapter 56 indicates that a particular record having a global identifier of QWERTY has been deleted, local synch engine 50 instructs local adapter 54 to delete the corresponding record in local data store 46. Once local adapter 54 complies with the instructions and deletes the record in local data store 46 having the global identifier QWERTY, local adapter 54 updates change log table 64 in local database 60 (step 110). Local adapter 54 modifies the entry for the deleted record in change log table 64 which now contains the following entries:

| Change Log Table (Local Database) | | | |
|---|---|---|---|
| Global Identifier | Record Identifier | Change Counter | Status |
| ZXCVB | Local Record 3 | 203 | NEW |
| FRTYDSAW | Local Record 2 | 201 | NEW |
| QWERTY | Local Record 1 | 204 | DELETED |

Local adapter 54 has modified the entry for the deleted record in change log table 64. The entry's change counter is set to two hundred four—one more than the previous maximum—and the status is set to deleted.

Local synch engine 50 now update synch status table 69 in local database 60 (step 112). Updated synch status table 69 in local database 60 now contains the following entry:

| Synch Status Table (Local Database) | | | | |
|---|---|---|---|---|
| Contract Identifier | First Adapter Identifier | First Maximum Change Counter | Second Adapter Identifier | Second Maximum Change Counter |
| 12345 | Local Adapter | 204 | Mobile Adapter | 404 |

The entry now contains updated first and second maximum change counters that if compared (step 104) with change log tables 64 and 65 in local and mobile databases 60 and 62 would reveal that local and mobile data stores 46 and 42 are synchronized. As there is only one entry on synch status table 69 in local database 60, local synch engine 50 quits.

When the user John Doe now initiates server synch engine 48, server synch engine 48 accesses the first entry from the synch status table 68 in server database 58 (step 100). Sending the second maximum change counter to local adapter 54 (identified by the second adapter identifier) and the first maximum change counter to server adapter 52 (identified by the first adapter identifier), server synch engine 48 issues a request for adapters 54 and 52 to respond with changes to data stores 46 and 38 (step 102). Using the maximum change counters, adapters 54 and 52 identify changes to data stores 46 and 38 that occurred after the previous synchronization (step 104).

Local adapter 54 compares the second maximum change counter it received from server synch engine 48 with the change counters in change log table 64 in local database 60. The comparison reveals that the second maximum change counter is exceeded by a change counter in change log table 64. Specifically, the change log table 64 contains two entries having change counters of two hundred three and two hundred four respectively exceeding the second maximum change counter of two hundred two. Local adapter 54 then recognizes that the records in local data store 46 associated with the change log table entries have been updated since the previous synchronization. Examining the status fields 76 for each entry reveals that one record has been added to and another record deleted from local data store 46. Consequently, local adapter 54 retrieves the new record from local data store 46 and returns the record along with its status and global identifier to server synch engine 48 (step 106). Local adapter 54 also returns the global identifier and status for the deleted record (step 106).

Server adapter 52 compares the first maximum change counter it received from server synch engine 48 with the change counters in change log table 63 in server database 58. The comparison reveals that the first maximum change counter is not exceeded by a change counter in change log table 63 in server database 58. Consequently, server adapter 52 responds to server synch engine 48 that no changes have been made in server data store 38 (step 106).

Server synch engine 48 synchronizes data stores 46 an 38 (step 108). As the returned record's status indicates that it is new, server synch engine 48 sends the record to server adapter 52 with instructions to replicate the new record in server data store 38. Server synch engine sends the global identifier and the status for the deleted record with instructions to delete the corresponding record—the record having the global identifier QWERTY—from server data store 38. Once server adapter 52 complies, server adapter 52 updates change log table 63 in server database 58 (step 110). Server adapter 52 adds an entry for the new record and updates the entry for the deleted record. Change log table 63 now contains the following entries:

| Change Log Table (Server Database) | | | |
|---|---|---|---|
| Global Identifier | Record Identifier | Change Counter | Status |
| ZXCVB | Server Record 3 | 103 | NEW |
| FRTYDSAW | Server Record 2 | 101 | NEW |
| QWERTY | Server Record 1 | 104 | DELETED |

The new entry now has a change counter of one hundred three, one more than the previous maximum value. The status for the entry is set to new. The updated entry has a change counter of one hundred four, two more than the previous maximum, and the status is set to deleted.

Server synch engine 48 then updates the first entry in synch status table 68 accessed in step 100 updating the first and second maximum change counters (step 112). Updated synch status table 68 in server database 58 now contains the following entries:

| Synch Status Table (Server Database) | | | | |
|---|---|---|---|---|
| Contract Identifier | First Adapter Identifier | First Maximum Change Counter | Second Adapter Identifier | Second Maximum Change Counter |
| 12345 | Server Adapter | 104 | Local Adapter | 204 |
| 12345 | Server Adapter | 102 | Mobile Adapter | 402 |

The first entry now contains updated first and second maximum change counters that if compared (step 104) with change log tables 63 and 64 in server and local databases 58 and 60 would reveal that server and local data stores 38 and 46 are synchronized.

Because synch status table 68 in server database 58 contains a second entry the process repeats with server synch engine 48 accessing the second entry (step 100). Sending the first maximum change counter to server adapter 52 (identified by the first adapter identifier) and the second maximum change counter to mobile adapter 56 (identified by the second adapter identifier), server synch engine 48 issues a request for adapters 52 and 56 to respond with changes to data stores 38 and 42 (step 102).

Using the maximum change counters, adapters 52 and 56 identify changes to data stores 38 and 42 that occurred after a previous synchronization (step 104). Mobile adapter 56 compares the second maximum change counter it received from server synch engine 48 with the change counters in change log table 65 in mobile database 62. The comparison reveals that the second maximum change counter is exceeded by change counters in change log table 65. Specifically, the change log table 65 contains two entries each having change counters that exceed the first maximum change counter of four hundred two. Mobile adapter 56 then recognizes that the records in mobile data store 42 associated with the change log table entries have been updated since the previous synchronization. Examining the status field 76 for one entry reveals that the associated record is new to mobile data store 42. Examining the status of the other entry reveals that the associated record has been deleted from mobile data store 42. Consequently, mobile adapter 56 retrieves the new record from mobile data store 42 and returns the record along with its status and global identifier to server synch engine 48 (step 106). Mobile adapter 56 also returns the global identifier and status for the deleted record (step 106).

Server adapter 52 compares the first maximum change counter it received from server synch engine 48 with the change counters in change log table 63 in server database 58. The comparison reveals that the first maximum change counter is exceeded by change counters in change log table 63 in server database 58. Specifically, the change log table 63 contains two entries each that have change counters exceeding the first maximum change counter of one hundred two. Server adapter 52 then recognizes that the records in server data store 38 associated with the change log table entries have been updated since the previous synchronization. Examining the status field 76 for one entry reveals that the associated record is new to server data store 38. Examining the status of the other entry reveals that the associated record has been deleted from server data store 38. Consequently, server adapter 52 retrieves the new record from server data store 38 and returns the record along with its status and global identifier to server synch engine 48 (step 106). Server adapter 52 also returns global identifier and status of the deleted record (step 106).

Server synch engine 48 synchronizes data stores 38 and 42 (step 108). Comparing the return global identifiers and status, server synch engine 48 determines that that same record has been deleted from and the same record added to server and mobile data stores 38 and 42. Consequently, server synch engine 48 concludes that data stores 38 and 42 are already synchronized. Adapters 52 and 56 take no further action, and change log tables 63 and 65 in server and mobile databases 58 and 62 need not be updated (step 110).

Server synch engine 48 then updates the second entry in synch status table 68 accessed in step 100 updating the first and second maximum change counters (step 112). Updated synch status table 68 in server database 58 now contains the following entries:

| Synch Status Table (Server Database) | | | | |
|---|---|---|---|---|
| Contract Identifier | First Adapter Identifier | First Maximum Change Counter | Second Adapter Identifier | Second Maximum Change Counter |
| 12345 | Server Adapter | 104 | Local Adapter | 204 |
| 12345 | Server Adapter | 104 | Mobile Adapter | 404 |

The second entry now contains updated first and second maximum change counters that if compared (step 104) with change log tables 63 and 65 in server and mobile databases 58 and 62 would reveal that server and mobile data stores 38 and 42 are synchronized. Because synch status table 68 in server database 58 contains no more entries, server synch engine 48 quits. Data stores 38, 42, and 46 are now synchronized.

The preceding examples are just that—examples—and are to be used only to help the reader's understanding of one potential implementation of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A computer implemented method for synchronizing first, second, and third shared data stores, comprising:
    providing a first status table having a first maximum change counter associated with the first shared data store and a second maximum change counter associated with the second shared data store;
    providing a second status table having a third maximum change counter associated with the second shared data store and a fourth maximum change counter associated with the third shared data store;
    updating the first maximum change counter with a value of a highest of a plurality of change counters associated with records in the first shared data store;
    updating the second maximum change counter with a value of a highest of a plurality of change counters associated with records in the second shared data store;
    identifying a first record in the first shared data store that is associated with a first change counter that exceeds the first maximum change counter;
    updating the second shared data store according to the first record to synchronize the second shared data store with the first shared data store;
    identifying a second record in the second shared data store that is associated with a second change counter that exceeds the second maximum change counter;
    updating the first shared data store according to the second record to synchronize the first shared data store with the second shared data store;
    updating the third maximum change counter with a value of a highest of a plurality of change counters associated with records in the second shared data store;
    updating the fourth maximum change counter with a value of a highest of the plurality of change counters associated with records in the third shared data store;
    identifying a third record in the second shared data store that is associated with a third change counter that exceeds the third maximum change counter;
    updating the third shared data store according to the third record to synchronize the third shared data store with the second shared data store;
    identifying a fourth record in the third shared data store that is associated with a fourth change counter that exceeds the fourth maximum change counter; and
    updating the second shared data store according to the fourth record to synchronize the second shared data store with the third shared data store.

2. The method of claim 1, further comprising updating the first maximum change counter with the first change counter and updating the second maximum change counter with the second change counter.

3. A computer implemented method for synchronizing shared data stores, comprising:
    recording a largest of one or more change counters associated with a record or records in a first shared data store as a first maximum change counter;
    recording a largest of one or more change counters associated with a record or records in a second shared data store as a second maximum change counter;
    maintaining the first and second change counters in a first status table;
    identifying a first record in the first shared data store that is associated with a change counter that exceeds the first maximum change counter;
    updating the second shared data store according to the first record to synchronize the second shared data store with the first shared data store;
    identifying a second record in the second shared data store that is associated with a change counter that exceeds the second maximum change counter;
    updating the first shared data store according to the second record to synchronize the first shared data store with the second shared data store;
    recording a largest of one or more change counters associated with a record or records in the second shared data store as a third maximum change counter;
    recording a largest of one or more change counters associated with a record or records in a third shared data store as a fourth maximum change counter;
    maintaining the third and fourth change counters in a second status table;
    identifying a third record in the second shared data store that is associated with a change counter that exceeds the third maximum change counter; and
    updating the third shared data store according to the third record to synchronize the third shared data store with the second shared data store;
    identifying a fourth record in the third shared data store that is associated with a change counter that exceeds the fourth maximum change counter; and
    updating the second shared data store according to the fourth record to synchronize the third shared data store with the first shared data store.

4. The method of claim 3, further comprising replacing the first maximum change counter recorded for the first shared data store with the change counter associated with the first record and replacing the second maximum change counter recorded for the second shared data store with the change counter associated with the second record.

5. A computer implemented method for synchronizing shared data stores, comprising:
    identifying first records in a first shared data store associated with change counters that exceed a first maximum change counter recorded for the first shared data store;
    updating records in a second shared data store using the first records to synchronize the second shared data store with the first shared data store;
    identifying second records in the second shared data store associated with change counters that exceed a second maximum change counter recorded for the second shared data store;
    updating records in the first shared data store using the second records to synchronize the first shared data store with the second shared data store;
    updating the first maximum change counter with the highest change counter associated with the first records;
    updating the second maximum change counter with the highest change counter associated with the second records;

identifying third records in the second shared data store associated with change counters that exceed a third maximum change counter recorded for the second shared data store;
updating records in a third shared data store using the third records to synchronize the third shared data store with the second shared data store;
identifying fourth records in the third shared data store associated with change counters that exceed a fourth maximum change counter recorded for the third shared data store;
updating records in the second shared data store using the fourth records to synchronize the second shared data store with the third shared data store;
updating the third maximum change counter with the highest change counter associated with the third records; and
updating the fourth maximum change counter with the highest change counter associated with the fourth records.

6. The method of claim 5, wherein the records in the first and second shared data stores are each associated with a change counter and a status; and
wherein the act of updating records in the second shared data store further comprises updating records in the second shared data store according to the status associated with each of the first records; and
wherein the act of updating records in the first shared data store further comprises updating records in the first shared data store according to the status associated with each of the second records; and
wherein the method further comprises updating the status and change counter associated with each record affected by the acts of updating the first and second shared data stores.

7. One or more computer readable storage media storing instructions for:
accessing a first status table having a first maximum change counter associated with a first shared data store and a second maximum change counter associated with a second shared data store;
accessing a second status table having a third maximum change counter associated with the second shared data store and a fourth maximum change counter associated with the third shared data store;
updating the first maximum change counter with a value of a highest of a plurality of change counters associated with records in the first shared data store;
updating the second maximum change counter with a value of a highest of a plurality of change counters associated with records in the second shared data store;
identifying a first record in the first shared data store that is associated with a first change counter that exceeds the first maximum change counter;
updating the second shared data store according to the first record to synchronize the second shared data store with the first shared data store;
identifying a second record in the second shared data store that is associated with a second change counter that exceeds the second maximum change counter;
updating the first shared data store according to the second record to synchronize the first shared data store with the second shared data store;
updating the third maximum change counter with a value of a highest of a plurality of change counters associated with records in the second shared data store;
updating the fourth maximum change counter with a value of a highest of the plurality of change counters associated with records in the third shared data store;
identifying a third record in the second shared data store that is associated with a third change counter that exceeds the third maximum change counter;
updating the third shared data store according to the third record to synchronize the third shared data store with the second shared data store;
identifying a fourth record in the third shared data store that is associated with a fourth change counter that exceeds the fourth maximum change counter; and
updating the second shared data store according to the fourth record to synchronize the second shared data store with the third shared data store.

8. The one or more media of claim 7, having further instructions for updating the first maximum change counter with the first change counter and updating the second maximum change counter with the second change counter.

9. One or more computer readable storage media storing instructions for:
recording a largest of one or more change counters associated with a record or records in a first shared data store as a first maximum change counter;
recording a largest of one or more change counters associated with a record or records in a second shared data store as a second maximum change counter;
maintaining the first and second change counters in a first status table;
identifying a first record in the first shared data store that is associated with a change counter that exceeds the first maximum change counter;
updating the second shared data store according to the first record to synchronize the second shared data store with the first shared data store;
identifying a second record in the second shared data store that is associated with a change counter that exceeds the second maximum change counter;
updating the first shared data store according to the second record to synchronize the first shared data store with the second shared data store;
recording a largest of one or more change counters associated with a record or records in the second shared data store as a third maximum change counter;
recording a largest of one or more change counters associated with a record or records in a third shared data store as a fourth maximum change counter;
maintaining the third and fourth change counters in a second status table;
identifying a third record in the second shared data store that is associated with a change counter that exceeds the third maximum change counter; and
updating the third shared data store according to the third record to synchronize the third shared data store with the second shared data store;
identifying a fourth record in the third shared data store that is associated with a change counter that exceeds the fourth maximum change counter; and
updating the second shared data store according to the fourth record to synchronize the second shared data store with the third shared data store.

10. The one or more media of claim 9, having further instructions for replacing the first maximum change counter recorded for the first shared data store with the change counter associated with the first record and replacing the second maximum change counter recorded for the second shared data store with the change counter associated with the second record.

11. One or more computer readable storage media storing instructions for:
   identifying first records in a first shared data store associated with change counters that exceed a first maximum change counter recorded for the first shared data store;
   updating records in a second shared data store using the first records to synchronize the second shared data store with the first shared data store;
   identifying second records in the second shared data store associated with change counters that exceed a second maximum change counter recorded for the second shared data store;
   updating records in the first shared data store using the second records to synchronize the first shared data store with the second shared data store;
   updating the first maximum change counter with the highest change counter associated with the first records;
   updating the second maximum change counter with the highest change counter associated with the second records;
   identifying third records in the second shared data store associated with change counters that exceed a third maximum change counter recorded for the second shared data store;
   updating records in a third shared data store using the third records to synchronize the third shared data store with the second shared data store;
   identifying fourth records in the third shared data store associated with change counters that exceed a fourth maximum change counter recorded for the third shared data store;
   updating records in the second shared data store using the fourth records to synchronize the second shared data store with the third shared data store;
   updating the third maximum change counter with the highest change counter associated with the third records; and
   updating the fourth maximum change counter with the highest change counter associated with the fourth records.

12. The medium of claim 11, wherein the records in the first and second shared data stores are each associated with a change counter and a status; and
   wherein the instructions for updating records in the second shared data store further comprise instructions for updating records in the second shared data store according to the status associated with each of the first records; and
   wherein the instructions for updating records in the first shared data store further comprise instructions for updating records in the first shared data store according to the status associated with each of the second records; and
   the medium having further instructions for updating the status and change counter associated with each record affected by the acts of updating the first and second shared data stores.

13. A synchronization system comprising one or more computer readable media and one or more processors for accessing data and executing instructions stored by the one or more computer readable media, wherein:
   the one or more computer readable media stores a first status table and a second status table, the first status table having a first maximum change counter associated with a first shared data store and a second maximum change counter associated with a second shared data store and the second status table having a third maximum change counter associated with the second shared data store and a fourth maximum change counter associated with a third shared data store; and
   the instructions include instructions for:
      updating the first maximum change counter with a value of a highest of a plurality of change counters associated with records in the first shared data store;
      updating the second maximum change counter with a value of a highest of a plurality of change counters associated with records in the second shared data store;
      for identifying a first record in the first shared data store that is associated with a first change counter that exceeds the first maximum change counter;
      for updating the second shared data store according to the first record to synchronize the second shared data store with the first shared data store;
      identifying a second record in the second shared data store that is associated with a second change counter that exceeds the second maximum change counter;
      for updating the first shared data store according to the second record to synchronize the first shared data store with the second shared data store;
      updating the third maximum change counter with a value of a highest of a plurality of change counters associated with records in the second shared data store;
      updating the fourth maximum change counter with a value of a highest of the plurality of change counters associated with records in the third shared data store;
      identifying a third record in the second shared data store that is associated with a third change counter that exceeds the third maximum change counter;
      updating the third shared data store according to the third record to synchronize the third shared data store with the second shared data store;
      identifying a fourth record in the third shared data store that is associated with a fourth change counter that exceeds the fourth maximum change counter; and
      updating the second shared data store according to the fourth record to synchronize the second shared data store with the third shared data store.

14. A synchronization system, comprising one or more computer readable media and one or more processors for accessing data and executing instructions stored by the one or more computer readable media, wherein the instructions include instructions for:
   recording a highest of one or more change counters associated with a record or records in a first shared data store as a first maximum change counter;
   recording a highest of one or more change counters associated with a record or records in a second shared data store as a second maximum change counter;
   maintaining the first and second change counters in a first status table;
   identifying a first record in the first shared data store that has a change counter exceeding the first maximum change counter;
   identifying a second record in the second shared data store that has a change counter exceeding the second maximum change counter;

updating the first shared data store according to the second record to synchronize the first shared data store with the second shared data store; and updating the second shared data store according to the first record to synchronize the second shared data store with the first shared data store;

recording a largest of one or more change counters associated with a record or records in the second shared data store as a third maximum change counter;

recording a largest of one or more change counters associated with a record or records in a third shared data store as a fourth maximum change counter;

maintaining the third and fourth change counters in a second status table;

identifying a third record in the second shared data store that is associated with a change counter that exceeds the third maximum change counter; and updating the third shared data store according to the third record to synchronize the third shared data store with the second shared data store;

identifying a fourth record in the third shared data store that is associated with a change counter that exceeds the fourth maximum change counter; and updating the second shared data store according to the fourth record to synchronize the second shared data store with the third shared data store.

15. In a synchronization environment, a computer implemented method comprising:

identifying a change counter associated with a record in a first shared data store that has a value that exceeds all other change counters associated with other records in the first shared data store;

identifying a change counter associated with a record in a second shared data store that has a value that exceeds all other change counters associated with other records in the second shared data store;

identifying a change counter associated with a record in a third shared data store that has a value that exceeds all other change counters associated with other records in the third shared data store;

recording the value of the change counter identified with regard to the first shared data store as a first maximum change counter in a first status table;

recording the value of the change counter identified with regard to the second shared data store as a second maximum change counter in the fist status table;

recording the value of the change counter identified with regard to the second shared data store as a third maximum change counter in a second status table;

recording the value of the change counter identified with regard to the third shared data store as a fourth maximum change counter in the second status table; and synchronizing the first, second, and third shared data stores according to the first, second, third, and fourth records.

* * * * *